United States Patent Office 2,965,614
Patented Dec. 20, 1960

2,965,614
HOMOPOLYMERS OF ORGANIC ISOCYANATES

Victor E. Shashoua, Wilmington, Del., assignor to E. I. du Pont de Nemours and Company, Wilmington, Del., a corporation of Delaware No Drawing. Filed Oct. 26, 1956, Ser. No. 618,450

16 Claims. (Cl. 260—77.5)

This invention relates to novel high molecular weight linear organic isocyanate polymers and to a method for their preparation.

It is well known that organic isocyanates, that is, organic esters of isocyanic acid, are easily converted to cyclic dimers and trimers. Catalysts such as pyridine and triethylphosphine are known to promote dimer formation, the structure of which is reported to be that of a uretidinedione. Trimers are produced from organic isocyanates by the action of such catalysts as potassium acetate, sodium carbonate, and triethylamine. The structure of the trimers, or isocyanurates, has been shown to be that of a 6-membered ring. All isocyanate dimers and trimers are cyclic compounds of relatively low molecular weight and of little or no commercial value for the production of shaped articles.

An object of this invention is to prepare high molecular weight linear organic isocyanate polymers. Another object of this invnetion is to provide N-substituted polyamides wherein carbon and nitrogen atoms alternate regularly in the polymer chain. Another object of this invention is to provide filaments, films, and other shaped articles from such polymers.

As used herein, "poly(isocyanate)" refers to the high molecular weight self-addition product formed on polymerization of organic isocyanates, in the same sense that polystyrene and poly(methyl methacrylate) are used to designate polymerization products from styrene and methyl methacrylate respectively.

In accordance with this invention high molecular weight linear polymers of organic isocyanates are prepared by treating an organic isocyanate under anhydrous conditions with an alkali metal anionic catalyst at a temperature below about −20° C. in a solvent for the organic isocyanate and the catalyst. Polymerization of the organic isocyanate proceeds expeditiously to produce high yields of N-substituted polyamide in which the substituent group attached to the nitrogen in the linear polymer chain is the organic radical attached to the nitrogen in the organic isocyanate starting material.

The poly(isocyanates) of this invention are, in general, prepared by polymerizing an organic isocyanate of the structural formula R—N=C=O in solution under anhydrous conditions at a temperature below about −20° C. in the presence of a soluble alkali metal anionic catalyst, R being a primary alkyl, primary aralkyl, primary alkenyl group or an aryl or alkaryl group in each of the latter two groups of which each annular carbon atom (carbon atom in the ring of the aryl radical) adjacent to the carbon atom attached to the nitrogen atom bears one hydrogen and R being free of substituents which are reactive with the isocyanate R—N=C=O in solution at temperatures below about −20° C. R may contain any substituents, therefore, which do not contain active hydrogen atoms, that is, hydrogen atoms which display activity to the Zerewitinoff test.

The term "primary," as utilized in conjunction with the term alkyl, aralkyl, alkenyl, etc., isocyanates refers to isocyanates in which the isocyanate or —N=C=O group is attached to a carbon atom bearing at least two hydrogen atoms. Thus, methyl, ethyl, propyl, butyl, and isobutyl groups are representative alkyl groups included within the scope of this invention, but alkyl groups such as isopropyl, secondary butyl, and the like are not included within the scope of this invention. Similarly, in the classes of aralkyl and alkenyl groups, arylisopropyl isocyanate and vinyl isocyanate are not within the scope of th.s invention.

Aromatic isocyanates such as aryl isocyanates and alkaryl isocyanates in which each annular carbon atom adjacent to the carbon atom attached to the nitrogen of the isocyanate group bears one hydrogen atom (is unsubstituted) may also be utilized to advantage in this invention. Representative useful aromatic isocyanates include, phenyl, m-tolyl, beta-naphthyl, 3-biphenylyl, alkoxyphenol, p-cholorophenyl, m-chlorophenyl, p-cyanophenyl, and the like.

Representative primary alkyl isocyanates which may be mentioned include methyl, ethyl, propyl, butyl, isobutyl, amyl, hexyl, heptyl, octyl, and higher alkyl isocyanates, such as undecyl, octadecyl, and the like. Unsaturated primary alkyl isocyanates which may be utilized include allyl, decenyl, and intermediate alkenyl isocyanates which are primary type, that is, the isocyanate group is attached to a carbon atom bearing two hydrogen atoms. Also carbalkoxyalkyl isocyanates may be used, such as, for example, carbethoxymethyl, carbethoxyethyl, and higher homologs. Aralkyl compounds which are useful in this invention include benzyl, phenylethyl, and phenylalkyl isocyanates containing a large number of carbon atoms in the aliphatic chain as well as aralkyl compounds in which the aryl group is substituted with other alkyl or non-alkyl groups, for example, methoxy, chloro, cyano groups, and the like.

All of the isocyanate monomers used in the practice of this invention are either commercially available or may be conveniently prepared by known reactions. One method for preparing the isocyanates comprises reacting the corresponding acid chloride with sodium azide in accordance with the well-known Curtius reaction.

The polymerization reaction in this invention must be carried out at a temperature below about −20° C. in order to attain a useful yield of polymer. Moreover, upon completion of the polymerization reaction, it is undesirable to permit the reaction product mixture to stand with catalyst present at room temperature or above for any substantial length of time since depolymerization of the poly(isocyanate) product sometimes occurs. Generally speaking, the polymerization reaction is carried out at a temperature between about −20° C. and about −100° C. Temperatures below −100° C. may be utilized although there appears to be no practical reason for doing so. Reaction temperatures between about −40° C. and about −70° C. are preferred as producing excellent yields of polymer under relatively convenient reaction conditions.

Catalysts for the polymerization reaction are anionic polymerization catalysts containing an alkali metal and soluble in the polymerization reaction mixture. Those found most useful include sodium, sodio naphthalene, sodium ketyls, sodium hydrosulfide, and sodium cyanide, particularly when utilized with dimethylformamide as a solvent for the reaction. The corresponding potassium and lithium compounds, when soluble, are effective also. For example, lithium cyanide is insoluble in dimethylformamide and is ineffective as a catalyst when dimethylformamide is employed as solvent, while lithium is soluble in dimethylformamide and effective as a catalyst in that medium. Sodium dispersions used in the preparation of the first and third catalysts listed above are prepared by high-speed agitation of molten sodium in xylene at 110° C. Sodium in dimethylformamide is then prepared by dissolving about 10 drops of the sodium dispersion (50% sodium in xylene) in 50–100 ml. of dimethylformamide. Sodio naphthalene is prepared in the usual way by the addition of sodium to a solution of naphthalene in ethylene glycol dimethyl ether. The sodium ketyls of benzophenone or benzophenone derivatives are suitable sodium ketyls and are prepared by adding approximately 1 equivalent of a sodium dispersion in xylene to a 1% solution of, for example, benzophenone or 4,4'-dimethoxybenzophenone in ethylene glycol dimethyl ether. Sodium hydrosulfide is prepared by drying commercially available sodium sulfhydrate for several weeks in vacuo. Sodium cyanide in dimethylformamide is prepared by dissolving reagent grade sodium cyanide in dry dimethylformamide. Suitable concentrations range from 0.3–0.68%. The preferred initiator is sodium cyanide in dimethylformamide. It is easy to prepare and is not inactivated by atmospheric moisture.

Organic solvents which are unreactive with the monomers and which are liquid at temperatures below about −20° C. are suitable media for carrying out the polymerization of organic isocyanates. Operable solvents include dimethylformamide, triethylamine, dichloromethane, and ethylene glycol dimethyl ether. The preferred reaction medium is dimethylformamide. A mixture of dimethylformamide and dimethylacetamide permits the use of a lower polymerization temperature than that obtainable by the use of dimethylformamide alone. In any case, the monomer and the catalyst must be appreciably soluble in the reaction medium at a temperature below −20° C. in order for polymerization to occur. The concentration of monomer in the reaction medium may range from about 3% to about 50% by weight or even higher. Monomer concentrations in the reaction mixture are preferably in the range 20–25%.

The amount of catalyst employed depends upon the amount of monomer to be polymerized. With highly purified monomer and solvent it may be as low as 0.001 mol of catalyst per mol of isocyanate. The preferred amount is about 0.005 mol per mol. Larger amounts are sometimes required when impurities which destroy the catalyst are present.

The reaction period for polymerization of organic isocyanates ranges from a few seconds to about one hour or longer. In general, short chain aliphatic isocyanates polymerize in a matter of seconds, those containing about 12 to 18 carbon atoms polymerize more slowly, and the aromatic isocyanates polymerize relatively sluggishly.

The polymerization reaction is markedly exothermic, and efficient stirring and cooling must be employed to keep the temperature low. High temperatures tend to promote cyclization with consequent formation of dimers and trimers rather than linear polymers. As a result, it is usually found that the yield of linear polymer increases with decreasing temperature of reaction. The yield of linear polymer approximates 80–100% at temperatures around −60° C. Cyclic dimers and trimers are usually found as by-products of the polymerization especially at higher temperatures. If a pure product is desired, the dimers and trimers may be removed from the crude product with methanol.

The molecular weight of organic poly(isocyanates) depends upon amount of catalyst, purity of materials, and the temperature of the polymerization. It has been found that the molecular weight increases steadily as the temperature of polymerization is lowered. This increase in yield and in molecular weight with decreasing temperature is typical of ionic polymerizations. Because of side reactions with solvent or impurities adventitiously present, in order to obtain poly(isocyanates) of suitably high molecular weight, it is preferred to add the isocyanate to the solvent medium pre-cooled to the temperature of reaction rather than to mix the two ingredients at room temperature and then cool to reaction temperature.

It will be obvious to those skilled in the art that cross-linked polymers are obtainable from compounds containing a plurality of isocyanate groups, providing only that at the point of attachment of each isocyanate group, the radical meets the requirements of polymerizable radicals, as defined for R above. Moreover, if the radical meets these requirements at only one of the points of attachment, then polymerization occurs only with the qualifying NCO group, leaving the other NCO functions intact for subsequent reaction, e.g., cross-linking, if desired. Thus, m-(1-isocyanatoethyl)phenyl isocyanate is polymerized according to this invention at the aromatic site, yielding a polymer which retains isocyanate functionality at the secondary aliphatic position. In the same fashion, 2,4-tolylene diisocyanate yields an essentially linear, i.e., soluble, polymer. In such cases, to avoid gelation through cross-linking by reaction with atmospheric moisture, it is preferred to alter the non-polymerizable isocyanate groups by reaction with alcohols, amines, etc., soon after the organic poly(isocyanate) is formed.

Infrared absorption spectra of the organic poly(isocyanates) of this invention are evidence that the polymers contain the repeating unit:

All of the polymers examined show a characteristic carbonyl absorption band at 5.85μ. No nitrogen-hydrogen absorption bands are observed in the spectra. All elemental analyses on the polymers of this invention show that the products are true self-addition polymers of the original isocyanate. Depolymerization by thermal cracking regenerates the monomeric isocyanate as evidenced by characteristic odor and infrared absorption spectrum, providing further evidence that the order of attachment is R to N to C to O. Chemical evidence of the polyamide structure is given in Example III below. As shown therein, alkaline hydrolysis of poly(p-methoxyphenyl isocyanate) yields the corresponding aromatic amine.

The polymers of this invention are generally of high molecular weight, generally greater than about 1000, often in excess of fifty thousand. Molecular weight determinations on typical polymers gave the following weight-average values, determined by light scattering methods on chloroform solutions of the polymers: polymer of n-hexyl isocyanate, 62,000; of n-heptyl isocyanate, 69,000; of 9-decenyl isocyanate, 387,000. Inherent viscosities of these polymers, ranging from 0.2 to about 15, and high solution viscosities at low solids content are further evidence of high molecular weight.

The polymers of this invention show varying degrees of crystallinity. The following list is arranged in order of increasing crystallinity as measured by X-ray diffraction methods: 9-decenyl-, heptyl-, butyl-, undecyl-, amyl-, and allyl isocyanate polymers.

The polymers of this invention are soluble in a wide variety of solvents. Poly(isocyanates) prepared from n-propyl isocyanate or lower homologs are soluble in sulfuric acid and in trifluoroacetic acid. Polymers from primary aliphatic isocyanates containing aliphatic groups larger than propyl are soluble in non-polar solvents, such as benzene and carbon tetrachloride. Many of the polymers are soluble in chloroform. Poly(benzyl isocyanate) and poly(phenyl isocyanate) are soluble in sulfuric acid, whereas substituted aromatic poly(isocyanates) such as poly(m-tolyl isocyanate) and poly(p-methoxyphenyl isocyanate) are soluble in dimethylformamide, but not in benzene or carbon tetrachloride.

The melting temperatures of polymers of this invention range from about 100° C. to about 250° C., the melting temperature decreasing with increasing size of the organic radical R in the isocyanate RNCO from which the polymer is derived. Some of the polymers soften at temperatures 50–100° C. below their melting temperatures due to plasticization by decomposition products. Generally, organic poly(isocyanates) decompose, i.e., depolymerize, at the melting temperatures or in the 130–200° C. range.

The aliphatic poly(isocyanates) of this invention show good hydrolytic stability to hot dilute aqueous acids and bases and excellent resistance to degradation by ultraviolet light. Films of the aliphatic poly(isocyanates) possess unusual flexibility at low temperatures and have good electrical insulating properties, as shown in Table I below.

TABLE I

| Film Material | Dissipation Factor (1,000 Cycles/Sec.) | Dielectric Constant (1,000 Cycles/Sec.) |
| --- | --- | --- |
| Poly(amyl isocyanate) | 0.001 | 2.42 |
| Poly(undecyl isocyanate) | 0.002 | 2.50 |
| Poly(hexyl isocyanate) | 0.001 | 2.42 |
| Do | 0.003 (150° C.) | 2.34 (150° C.) |
| Poly(ethylene terephthalate) | 0.006 | 3.12 |
| Do | 0.006 (150° C.) | 3.48 (150° C.) |

If it is desired to have functional groups present in the polymeric products of this invention, they may be present in the monomeric organic isocyanate, providing, of course, that the group or groups do not contain active hydrogen, i.e., reactive with the —NCO group. For example, groups compatible with the isocyanate group are chloro, cyano, carbethoxy, dialkylamide, and aliphatic or aromatic unsaturation.

The following examples illustrate specific embodiments of this invention. All parts and percentages are by weight unless otherwise indicated.

*Example I*

A mixture of 25 ml. of phenyl isocyanate and 25 ml. of freshly distilled, dry N,N-dimethylformamide is added to a flask equipped with a stirrer, nitrogen inlet, nitrogen outlet, and thermometer. The mixture is cooled under a nitrogen atmosphere to —40° C. in a Dry Ice/acetone bath and then 1 ml. of a catalyst solution prepared by dissolving 10 drops of metallic sodium dispersion (50% sodium in xylene) in 50 ml. of dimethylformamide is cooled to —40° C. and is added, all at once, to the stirred reaction mixture. A colorless, transparent film immediately forms at the edge of the reaction flask. A portion of the product, adhering to the walls of the flask, is pried loose into the bulk of the solution, whereupon an immediate reaction takes place, the temperature rising to —25° C. while the reaction mixture solidifies. The mixture is then stirred vigorously with dimethylformamide at room temperature. The precipitated polymer is filtered, washed several times with dimethylformamide, and dried, yielding 7.5 g. of poly(phenyl isocyanate).

On addition of the filtrate to a large volume of water, there is precipitated a small amount of the cyclic trimer, triphenyl isocyanurate.

Poly(phenyl isocyanate) so obtained is a white solid which decomposes at 197° C., whereas the cyclic dimer and trimer of phenyl isocyanurate melt at 175° C. and 277° C., respectively. Poly(phenyl isocyanate) is insoluble in dimethylformamide and in benzene, but dissolves in sulfuric acid and in butylamine. Analysis of the infrared absorption spectrum of the polymer shows characteristic strong bands of phenyl and carbonyl groups, as well as the presence of a disubstituted amide structure. The infrared spectrum differs from that of the dimer and trimer in the bands attributable to other structural features.

*Example II*

A solution of 10 ml. of n-butyl isocyanate and 30 ml. of dimethylformamide is cooled to —55° C. under nitrogen. While the mixture is rapidly stirred, 2 ml. of a 0.3% solution of sodium cyanide in dimethylformamide is added slowly. A white, fibrous product precipitates almost immediately. After a few minutes, 100 ml. of methanol is added to the mixture. The solid material is filtered and extracted overnight with methanol in a Soxhlet extractor. There is obtained 6.5 grams (76%) of poly(butyl isocyanate), melting at 209° C. and having an intrinsic viscosity of 15.7 in benzene. The polymer so prepared is soluble in carbon tetrachloride, chloroform, trichloroethylene, tetrachloroethylene, tetrachloroethane, chlorobenzene, ethylene chloride, benzene, toluene, and xylene, as well as trifluoroacetic and sulfuric acids.

Poly(butyl isocyanate) so prepared is dissolved in benzene and reprecipitated by pouring into an excess of methanol, stirring vigorously. Upon analysis, this polymer contained: carbon, 60.4%; hydrogen, 8.9%; nitrogen, 13.3%. Calculated analysis for poly(butyl isocyanate): C, 60.6%; H, 9.2%; N, 14.1%. Clear and flexible films are obtained from the benzene solution of this polymer. Fibers are obtained from the benzene solution by the usual wet-spinning techniques.

*Example III*

A 250 ml. flask is equipped with stirrer, calcium chloride tube, thermometer, and nitrogen inlet. One neck of the flask is sealed with a rubber diaphragm. To the flask is added 350 ml. of dry dimethylformamide. The contents are cooled to —58° C. under a nitrogen atmosphere, 100 ml. of p-methoxyphenyl isocyanate is added, and the mixture is recooled to —58° C. To the vigorously stirred mixture is added 3 ml. of a dimethylformamide solution saturated with sodium cyanide (0.68%). The catalyst is added dropwise over a period of 2 minutes from a syringe bearing a hypodermic needle which pierces the rubber diaphragm. The mixture is stirred for 1 hour at —58° C., excess methanol is added, and the precipitated poly(p-methoxyphenyl isocyanate) is filtered and washed with methanol. There is obtained a quantitative yield of polymer which melts at 224° C. and has an inherent viscosity of 0.3 (0.5% solution in dimethylformamide).

A sample of poly(p-methoxyphenyl isocyanate) is refluxed for 3 days with aqueous 1% sodium hydroxide. The mixture is filtered, and the filtrate is extracted with ether. The ethereal solution is dried and evaporated, leaving a brownish oil which solidifies on cooling. The residue is identified as p-anisidine, by formation of the picrate, which melts at 173° C. alone and admixed with an authentic sample of p-anisidine picrate.

*Example IV*

A mixture of 9 g. of distilled ethyl isocyanate in 25 ml. of dimethylformamide is polymerized according to the method of Example II, except that the catalyst solution is 2 ml. of a 1% solution of the sodium ketyl of benzophenone in ethylene glycol dimethyl ether. The catalyst is added over a period of 30 seconds. Worked up as before, the polymer is obtained as a fibrous solid in 48% yield, melting with decomposition at 195–215° C. The inherent viscosity of an 0.5% solution in trifluoroacetic acid is over 0.2. As against a calculated carbon, hydrogen and nitrogen analysis of C, 50.7%; H, 7.1%; N, 19.7%, it was found as follows: C, 50.6%; H, 6.9%; N, 19.2%.

*Example V*

A mixture of 10 ml. of 9-decenyl isocyanate in 30 ml. of dimethylformamide is polymerized at —55° C. by the addition of 2 ml. of a solution of sodium cyanide in dimethylformamide (0.3%) added dropwise over a period of 1 minute. The polymerization is carried out as in the method of Example II, and an 80% yield of poly(9-decenyl isocyanate) is obtained. The polymer melts at 170–190° C. and has a weight-average molecular weight of 387,000 as determined by light scattering. The inherent viscosity of a 0.014% solution of the product in benzene is 14.1. Calculated carbon, hydrogen, nitrogen analysis for the polymer is C, 72.8%; H, 10.6%; N, 7.7%. It was found as follows: C, 72.8%; H, 10.2%; N, 7.6%.

Limp films are obtained from the benzene solution of this polymer. After exposure to ultraviolet radiation, such films become stiff and insoluble, and the melting temperature is thereby increased to 285° C. Fibers are formed by wet-spinning of the benzene solution.

Example VI

According to the method described in Example III, 12.5 ml. of benzyl isocyanate is dissolved in 30 ml. of dimethylformamide cooled to −40° C. To the cooled solution, 1 ml. of saturated sodium cyanide in dimethylformamide is added over a period of 2 minutes. Poly(benzyl isocyanate) is obtained as a fibrous solid in 50% yield. The polymer melts at 246° C. Calculated carbon, hydrogen, nitrogen analysis for the product: C, 72.2%; H, 5.3%; N, 10.5%. Found: C, 71.9%; H, 5.2%; N, 10.6%.

Example VII

According to the method described in Example III, a mixture of 21 ml. of dimethylformamide and 9 ml. of dimethylacetamide is cooled to −70° C., and 10 ml. of carbethoxymethyl isocyanate is added. To the cooled solution, 3 ml. of a solution of sodium cyanide in dimethylformamide (0.6%) is added over a period of 5 minutes. After 30 minutes at −70° C., there is recovered 6.3 g. of colorless poly(carbethoxymethyl isocyanate) having an inherent viscosity of 0.38 (0.5% solution in sulfuric acid). The polymer is soluble in trifluoroacetic acid and in sulfuric acid. The polymer melts at 230–260° C., and long fibers are drawn from the melt. Films are obtained by molding under pressure at 150–250° C.

Example VIII

According to the method described in Example III, 30 ml. of dimethylformamide is cooled to −50° C. and 3.5 ml. of 2-cyanoethyl isocyanate is added. To the stirred mixture is added 1 ml. of a solution of sodium cyanide in dimethylformamide (0.6%). After an hour at −58° C., there is recovered 0.25 g. of colorless poly(2-cyanoethyl isocyanate). The polymer melts at 220–222° C. and dissolves in sulfuric acid.

Example IX

A sheet of ordinary filter paper is treated with a 0.5% solution of poly(9-decenyl isocyanate) in benzene. After being dried, the paper is still soft and is found to have increased wet strength and to be waterproof.

Example X

To 15 ml. of dry ethylene glycol dimethyl ether cooled under nitrogen to −50° C. there is added 7 ml. of p-tolyl isocyanate. The mixture is cooled to −50° C., and 2.5 ml. of a (0.06%) solution of sodio naphthalene in ethylene glycol dimethyl ether is added dropwise with stirring over a period of 30 seconds. During the addition the solution becomes quite viscous. The mixture is stirred for about 15 minutes during which time poly(p-tolyl isocyanate) precipitates. After the addition of methanol the polymer is collected by filtration, washed, and dried. The inherent viscosity of a 0.5% solution of the product in tetrachloroethane/phenol (66/100) is 0.97.

Example XI

According to the method described in Example II, a mixture of 20 ml. of phenyl isocyanate in 50 ml. of dimethylformamide is polymerized at −46° C. by the addition of 2 ml. of a saturated solution of sodium hydrosulfide in dimethylformamide. The temperature rises and there is a noticeable increase in viscosity. Worked up as before, the precipitated poly(phenyl isocyanate) is obtained in 25% yield.

The poly(isocyanates) of this invention may be used as a means of temporary blocking the —NCO group. Since these polymers depolymerize on heating, isocyanate functionality may be regenerated by heating to 150–200° C. Other uses will be apparent to those skilled in the art.

The polymers of this invention in the shape of films and fibers are useful, particularly where advantage can be taken of their good electrical insulating properties or their stability to ultraviolet light. Organic poly(isocyanates) are also useful as waterproofing agents for cellulose.

After-reactions may be carried out on the polymeric products of this invention. Such reactions include halogenation, sulfonation, nitration, etc. Such processes are advantageous when it is desired to introduce into the polymers functional groups containing active hydrogen. Polymers containing aliphatic unsaturation may be cross-linked, preferably by exposure to ultraviolet light.

The claimed invention:

1. A linear polymer consisting solely of repeating units having the structural formula

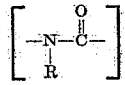

where R is a monovalent organic radical attached to the nitrogen of the formula by a carbon atom selected from the group consisting of (I) a carbon atom of an aromatic ring in which each annular carbon atom adjacent to said carbon atom bears one hydrogen and (II) a carbon atom bearing at least two hydrogen atoms, said organic radical having no active hydrogen-containing substituents which are reactive with an isocyanate group, said polymer containing more than 3 of said repeating units and having a molecular weight greater than 1000, said organic radicals R being alike in each of said repeating units.

2. A process for preparing a linear high molecular weight self-addition polymer of an organic isocyanate which comprises treating a solution of an organic isocyanate in an inert reaction medium under anhydrous conditions with an alkali metal anionic polymerization catalyst soluble in said reaction medium, at a temperature below about −20° C., said solution being free from any substance having active hydrogen-containing substituents which are reactive with an isocyanate group, said organic isocyanate having the structural formula

R being a monovalent organic radical attached to the nitrogen of the formula by a carbon atom selected from the group consisting of (I) a carbon atom of an aromatic ring in which each annular carbon atom adjacent to said carbon atom bears one hydrogen and (II) a carbon atom bearing at least two hydrogen atoms, said organic radical having no active hydrogen-containing substituents which are reactive with an isocyanate group.

3. The polymer of claim 1 wherein said monovalent organic radical R contains from 1 to 18 carbon atoms.

4. The process of claim 2 wherein said monovalent organic radical R contains from 1 to 18 carbon atoms.

5. The polymer of claim 1 in which R is an alkyl radical containing more than 3 carbon atoms.

6. The polymer of claim 5 in which R is an n-butyl group.

7. The process of claim 2 in which the anionic polymerization catalyst is selected from the group consisting of sodium, sodio naphthalene, sodium ketyl, sodium hydrosulfide, and sodium cyanide.

8. Process of claim 7 in which the temperature is between about —40° C. and about —70° C.

9. The process of claim 7 in which the solvent comprises dimethylformamide.

10. The process of claim 9 in which the anionic polymerization catalyst is sodium cyanide.

11. The process of claim 10 in which the organic isocyanate is an alkyl isocyanate, the alkyl group containing more than 3 carbon atoms.

12. The polymer of claim 1 wherein R has the structural formula

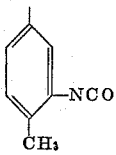

13. The polymer of claim 1 wherein R is a 9-decenyl radical.

14. The polymer of claim 1 wherein said polymer is capable of forming a self-supporting film.

15. The polymer of claim 14 in the form of a fiber.

16. The polymer of claim 14 in the form of a film.

References Cited in the file of this patent

UNITED STATES PATENTS

| | | |
|---|---|---|
| 2,334,476 | Coffman | Nov. 16, 1943 |
| 2,468,713 | Kropa | Apr. 26, 1949 |
| 2,597,025 | Orth | May 20, 1952 |
| 2,768,895 | Kamlet | Oct. 30, 1956 |
| 2,810,711 | Holtschmidt | Oct. 22, 1957 |
| 2,853,473 | Campbell et al. | Sept. 23, 1958 |

OTHER REFERENCES

Biggs et al.: Ind. and Eng. Chem., vol. 38, #10, pp. 1016–1019, October 1946.